US012654357B2

(12) United States Patent
Kim

(10) Patent No.: US 12,654,357 B2
(45) Date of Patent: Jun. 16, 2026

(54) MOLD AND CONSTRUCTION PANEL MANUFACTURING METHOD USING SAME

(71) Applicant: University of Seoul Industry Cooperation Foundation, Seoul (KR)

(72) Inventor: Nam Joo Kim, Seoul (KR)

(73) Assignee: UNIVERSITY OF SEOUL INDUSTRY COOPERATION FOUNDATION (KR)

( * ) Notice: Subject to any disclaimer, the term of this patent is extended or adjusted under 35 U.S.C. 154(b) by 111 days.

(21) Appl. No.: 18/719,091

(22) PCT Filed: Dec. 6, 2022

(86) PCT No.: PCT/KR2022/019699
§ 371 (c)(1),
(2) Date: Jun. 12, 2024

(87) PCT Pub. No.: WO2023/121056
PCT Pub. Date: Jun. 29, 2023

(65) Prior Publication Data

US 2025/0033243 A1 Jan. 30, 2025

(30) Foreign Application Priority Data

Dec. 22, 2021 (KR) ........................ 10-2021-0184631

(51) Int. Cl.
*B28B 7/02* (2006.01)
*B28B 1/14* (2006.01)
(Continued)

(52) U.S. Cl.
CPC ................ *B28B 7/025* (2013.01); *B28B 1/14* (2013.01); *E04C 2/04* (2013.01); *E04C 2/30* (2013.01)

(58) Field of Classification Search
CPC .......... B28B 7/025; B28B 7/04; B28B 23/022
See application file for complete search history.

(56) References Cited

U.S. PATENT DOCUMENTS 3,049,785 A * 8/1962 Chiado ...................... E04B 7/14 264/32
3,618,886 A * 11/1971 Graham ................ B29C 33/308 249/155

(Continued)

FOREIGN PATENT DOCUMENTS

JP H07276335 A 10/1995
KR 20070075375 A 7/2007

(Continued)

OTHER PUBLICATIONS

International Search Report for PCT/KR2022/019699, mailed Mar. 24, 2023.

*Primary Examiner* — Virak Nguon
(74) *Attorney, Agent, or Firm* — Renaissance IP Law Group LLP

(57) ABSTRACT

The present inventive concept relates to a mold and a construction panel manufacturing method using same, in which, in order to manufacture a construction panel, a surface on which a raw material is applied is formed into a curved surface by continuously connecting a rope. The mold comprises: first and second side plates facing each other; a curved base forming a predetermined curved surface between the first and second side plates by being interweaved to the first and second side plates; and a sheet member disposed along the curved base so as to form the curved surface, and enabling a construction panel raw material to be applied thereon. Thus, construction panels having variously-shaped curved surfaces may be manufactured by repeatedly using the first and second side plates while differing the interweaving of a rope so as to correspond to a curved surface of a construction panel to be manufactured. Accordingly, the present inventive concept has the effect of (Continued)

having excellent manufacturing efficiency for construction panels having curved surfaces.

9 Claims, 10 Drawing Sheets

(51) Int. Cl.

*E04C 2/04* (2006.01)

*E04C 2/30* (2006.01)

(56) References Cited

U.S. PATENT DOCUMENTS

2014/0120195 A1* 5/2014 Ploskonka ............ B29C 33/308 425/174

2020/0353644 A1* 11/2020 Gonzalez Bohme ........................ B29C 33/307

2020/0361119 A1* 11/2020 Loh ....................... B29C 33/308

FOREIGN PATENT DOCUMENTS

| | | | |
|---|---|---|---|
| KR | 20100128513 | A | 12/2010 |
| KR | 20150019465 | A | 2/2015 |
| KR | 20180085176 | A | 7/2018 |

* cited by examiner

MOLD AND CONSTRUCTION PANEL MANUFACTURING METHOD USING SAME

TECHNICAL FIELD

The present inventive concept relates to a mold and a construction panel manufacturing method using the same, and more specifically, a mold and a construction panel manufacturing method using the same that can repeatedly produce construction panels having various curved surfaces in the same shape.

BACKGROUND ART

In general, to manufacture construction panels, raw materials such as red clay and sand are mixed and crushed by a crusher such as a roll crusher or a ball mill. The crushed materials are then screened through sieving.

The screened materials are supplied with water to create a slurry through stirring, and then, is dehydrated using a dehydrator to form a dough-like material with appropriate moisture content. The dough-like material is supplied to a construction panel mold using a mixer, which is a weighing feeder, is molded, and completely manufactured through drying and firing.

Conventional construction panel molds were made of materials like wood and iron and were formed flat, and thus, construction panels formed through the conventional construction panel molds could be manufactured only flat. So, the conventional construction panel molds cannot form construction panels with curved surfaces.

To overcome the above problem, wood and metal panels were processed to create curved molds, allowing for the manufacture of construction panels with curved surfaces. However, such molds which are based on rigid materials often got damaged during the removal of panels after drying. Accordingly, the conventional molds has a disadvantage in that it is difficult to reuse the molds repeatedly.

To manufacture construction panels with various curved surfaces, a new mold had to be made for each specific curve every time. Additionally, since the manufactured molds could not be reused, costs for manufacturing construction panels are increased.

(Patent Literature 00001) Korean Patent No. 10-1108231 (Jan. 13, 2012)

DISCLOSURE

Technical Problem

An objective of the present inventive concept is to provide a mold and a construction panel manufacturing method using the same, which can freely manufacture curved surfaces of construction panels.

Furthermore, another objective of the present inventive concept is to provide a mold and a construction panel manufacturing method using the same, which allow repeatedly manufactured panels to have the same curved surfaces.

Moreover, a further objective of the present inventive concept is to provide a mold and a construction panel manufacturing method using the same, which can robustly manufacture construction panels with curved surfaces.

Technical Solution

There is provided a mold having a curved surface formed on the surface, on which a material for manufacturing a construction panel is applied, through a continuous connection of a rope.

The mold includes: first and second side panels which face each other; a curved base which is woven to the first and second side panels to form a predetermined curved surface between the first and second side panels; and a sheet member which is arranged along the curved base to form the curved surface and on which the construction panel material is applied.

A plurality of holes through which the rope forming the curved base passes and to which the rope is woven are formed in the first and second side panels at intervals in the X-axis and Y-axis directions.

The distance between the centers of adjacent holes ranges from 5 mm to 10 mm.

The rope is continuously woven and connected from one end to the other end of the first and second side panels in the length direction.

The rope is made of fiber yarn or resin yarn.

The sheet member is made of latex or silicone with a thickness of 2.5 mm or less.

The mold further includes a fixing member which is placed outside the first and second side panels and to which the rope passing through the first and second side panels is woven.

A construction panel manufacturing method according to an embodiment of the present inventive concept includes: meshing a curved surface of a construction panel to be manufactured; setting holes in the first and second side panels where a rope will be woven for meshing; weaving the rope to the set holes to form a meshed curved base between the first and second side panels; arranging a sheet member on the curved base; applying construction panel material on the sheet member; and drying the applied construction panel material and separating the dried construction panel material from the sheet member to perform plastic-working.

The rope passes through the holes of the first and second side panels, is woven to the holes, and is continuously connected from one end to the other end of the first and second side panels in the length direction.

In forming the meshed curved base, the shape of the curved base positioned between the first and second side panels when viewed from above forms a shape that triangles are continuously connected through the continuous connection of the rope.

Advantageous Effect

According to one aspect of the problem-solving means of the present inventive concept, the first side panel and the second side panel can form the curved base having the curved surface of various forms in the molding by varying the weaving of the rope according to the curved surface of the construction panel to be manufactured, thereby enhancing the manufacturing efficiency of the construction panels with curved surfaces.

Furthermore, according to one aspect of the problem-solving means of the present inventive concept, since the curved base is formed by meshing the rope through the first and second side panels, thereby accurately installing the rope on the first and second side panels.

Moreover, according to one aspect of the problem-solving means of the present inventive concept, the rope forming the curved base is continuously connected and woven from one end to the other end of the first and second side panels in the length direction, thereby maximizing the strength of the curved base. Additionally, according to one aspect of the problem-solving means of the present inventive concept, the curved panels that require a new mold for each shape is systemized so as to repeatedly manufacture molds several times, thereby reducing the cost, time, and materials involved in manufacturing molds.

Furthermore, according to one aspect of the problem-solving means of the present inventive concept, the construction panels manufactured repeatedly by the curved surface formed by the curved base can always have the same curved dimensions, thereby providing excellent manufacturability of construction panels.

Additionally, according to one aspect of the problem-solving means of the present inventive concept, the shape of the curved base, which is meshed into a triangular shape in the state where the construction panel material is applied on the sheet member, can be formed on the construction panel material being dried, thereby enhancing the aesthetic appearance of the manufactured construction panels. Moreover, as the triangles forming the mesh structure become smaller, the density of the mesh structure increases, thereby naturally expressing the curved surface of the construction panel formed by the mesh structure.

In addition, according to one aspect of the problem-solving means of the present inventive concept, when viewed from above, the curved base formed by the rope has a shape that triangles are continuously connected, thereby providing excellent stability in installation of the curved base.

MODE FOR INVENTIVE CONCEPT

Figure 1:
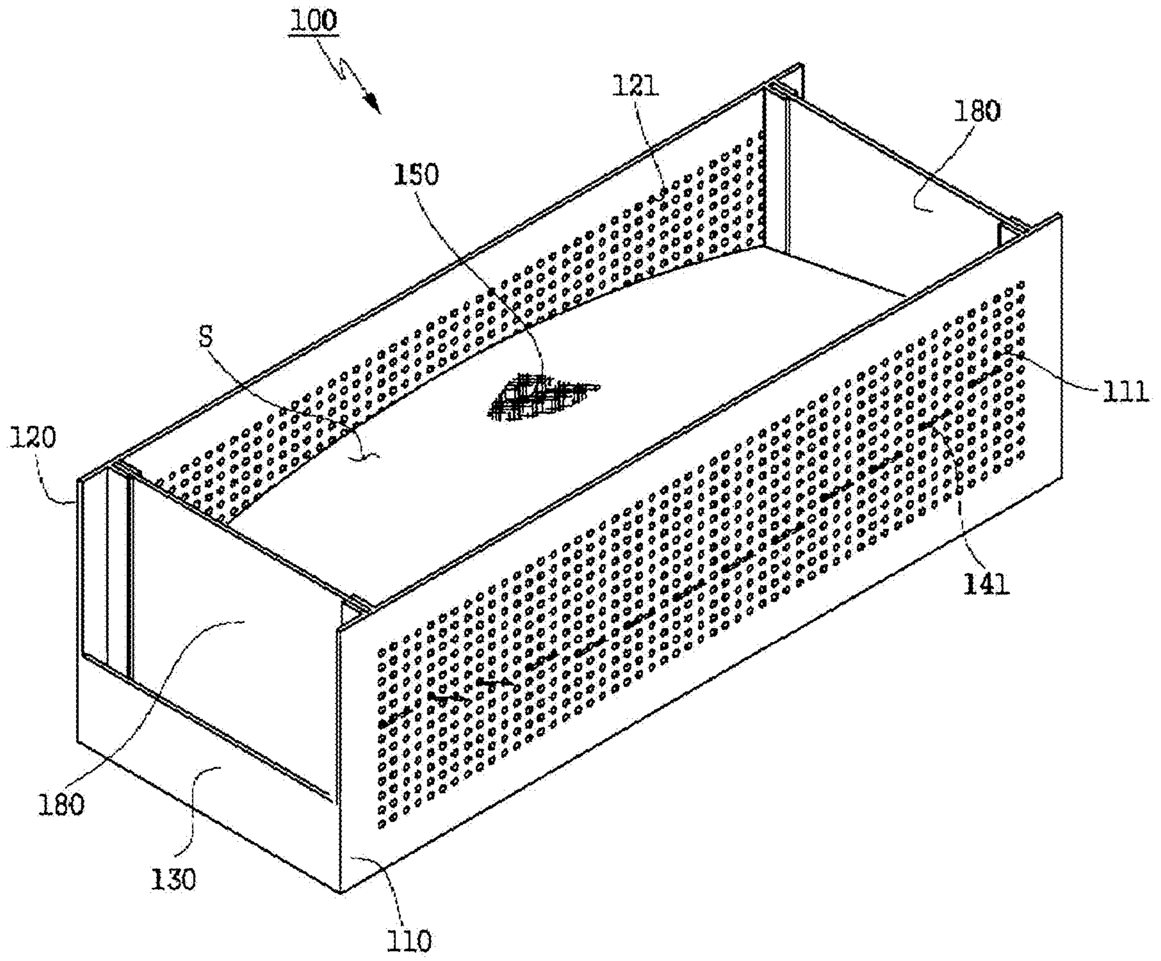
FIG. 1 is a schematic view illustrating a mold according to an embodiment of the present inventive concept.

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

The shapes, sizes, proportions, angles, and numbers disclosed in the drawings for describing the embodiments of the present inventive concept are exemplary and therefore the present inventive concept is not limited to the depicted items. In addition, in a case where it is determined that detailed description of well-known features and configurations according to the present disclosure and all other matters unnecessarily obscure the gist of the present disclosure, the detailed description will be omitted. In this specification, the terms 'comprises,' 'has,' 'includes' etc., are used, unless specified otherwise, to mean that additional parts may be included. A singular expression also includes a plural expression unless there is an explicit statement specifying otherwise.

In interpreting the components, unless explicitly stated otherwise, it is interpreted to include the margin of error.

Although terms such as first, second, etc., are used to describe various components, such components are not limited by the terms. The terms are used merely to distinguish one component from another. Therefore, a first member mentioned below could technically be a second member within the scope of the technical idea of the present inventive concept.

Unless specified otherwise, the same reference numerals throughout the specification refer to the same components.

The features of the various embodiments of the present inventive concept may be partially or entirely coupled or combined in various ways, as will be readily understood by those skilled in the art, and each embodiment may be implemented independently or in relation to others.

Hereinafter, the present inventive concept will be described in detail with reference to the accompanying drawings. A mold according to an embodiment of the present inventive concept will be described with reference to FIGS. 1 through 8.

Figure 2:
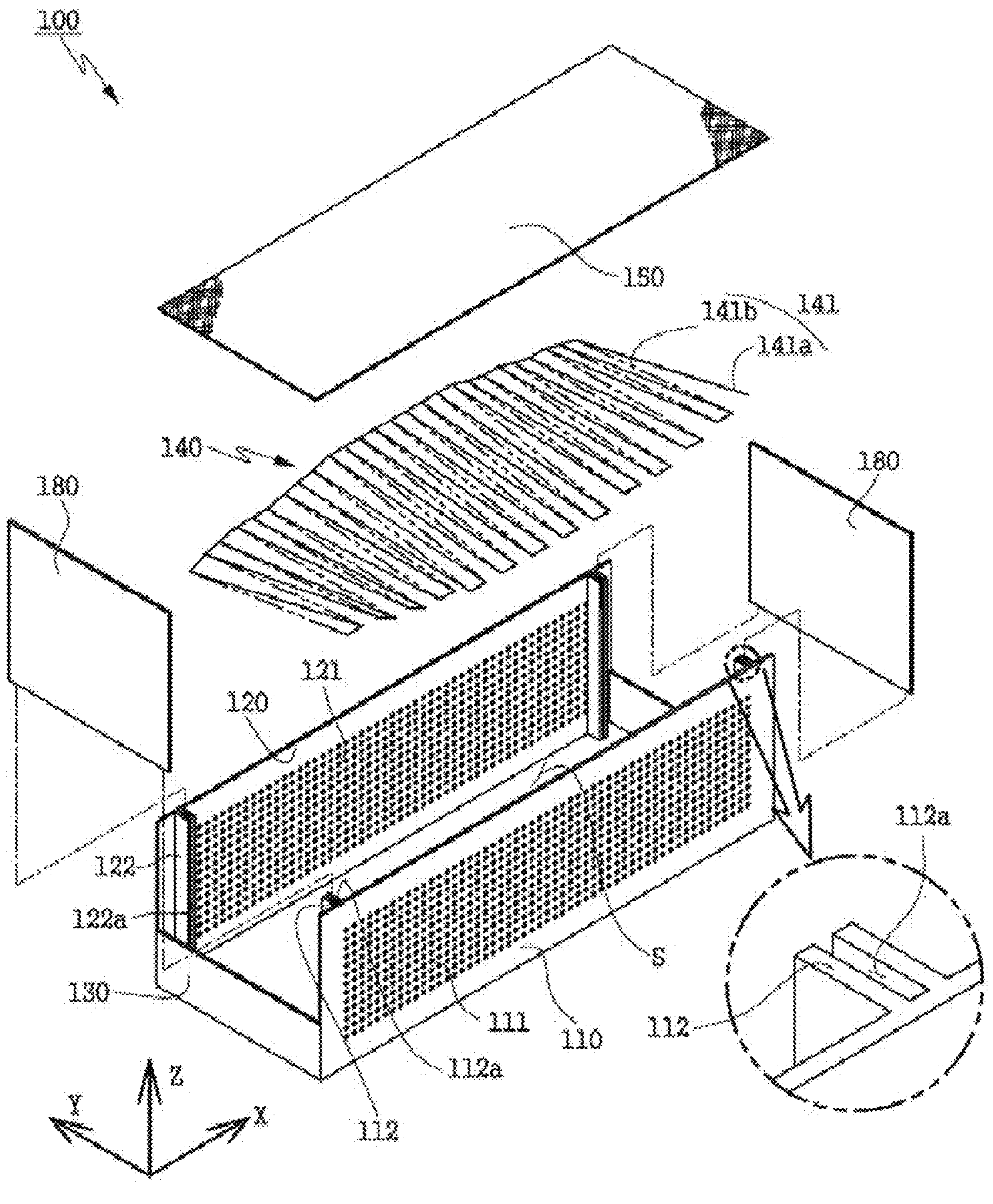
FIG. 2 is an exploded view of FIG. 1.
Figure 3:
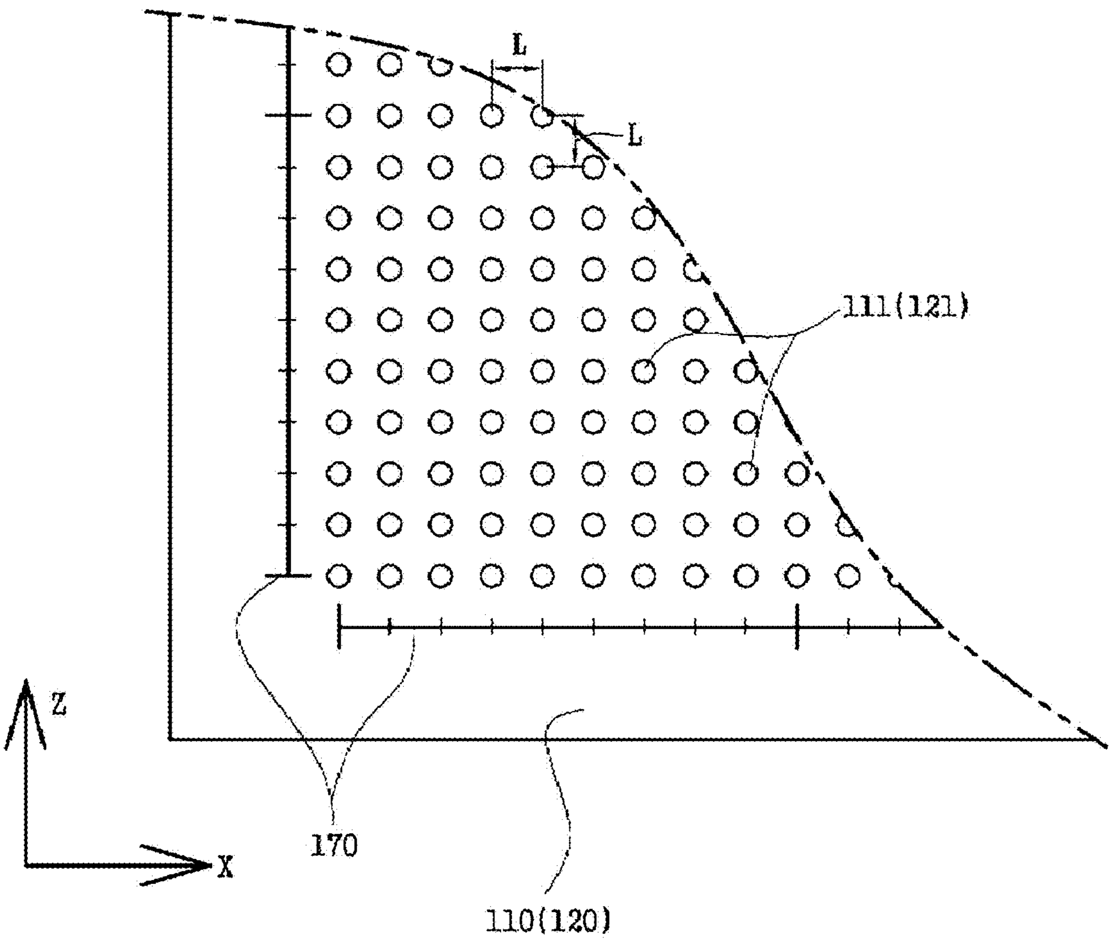
FIG. 3 is an enlarged view of a portion of a first side panel in FIG. 2.
Figure 4:
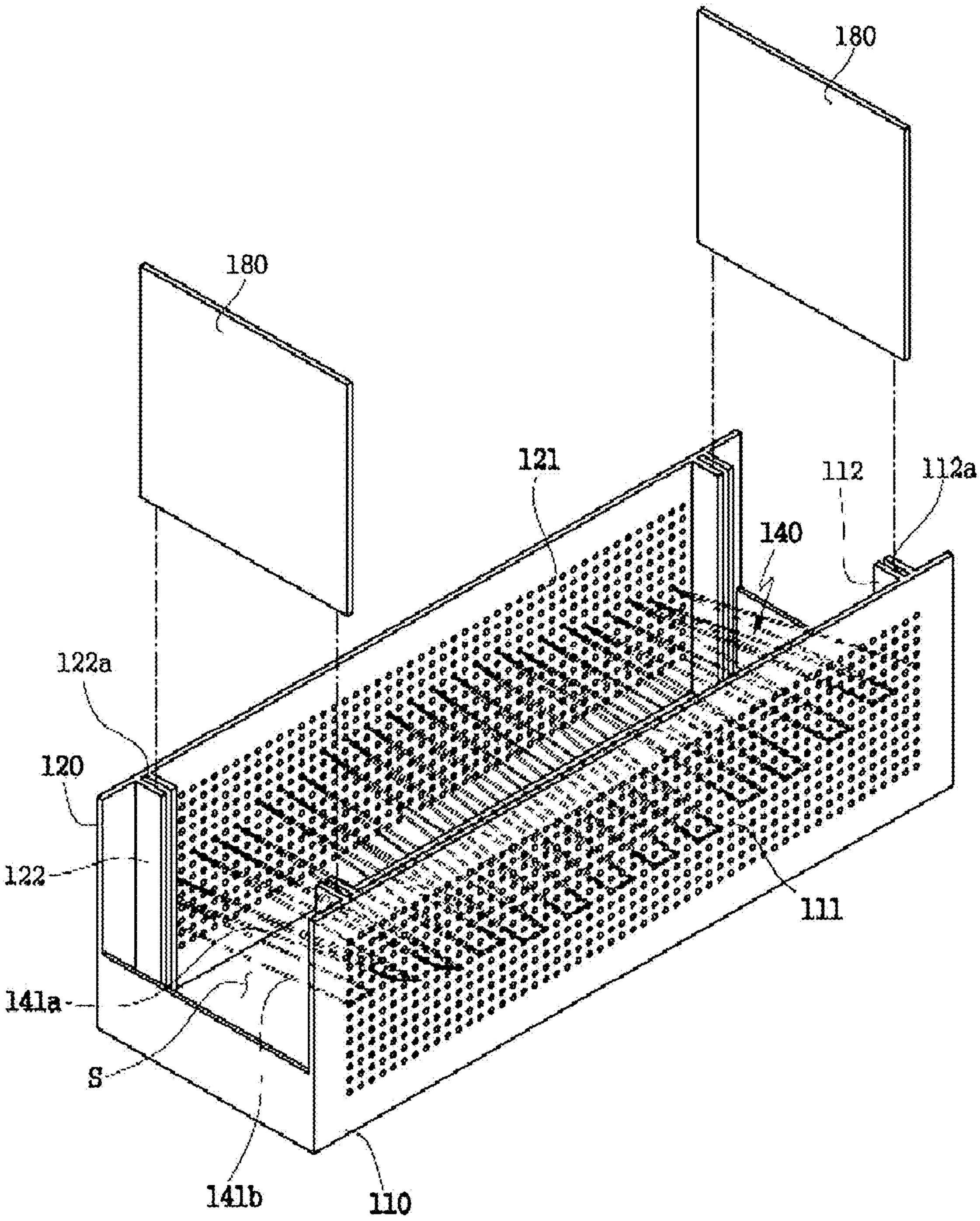
FIG. 4 is a schematic view illustrating a state in which a curved base is meshed and woven to first and second side panels of FIG. 2 in a triangular shape.
Figure 5:
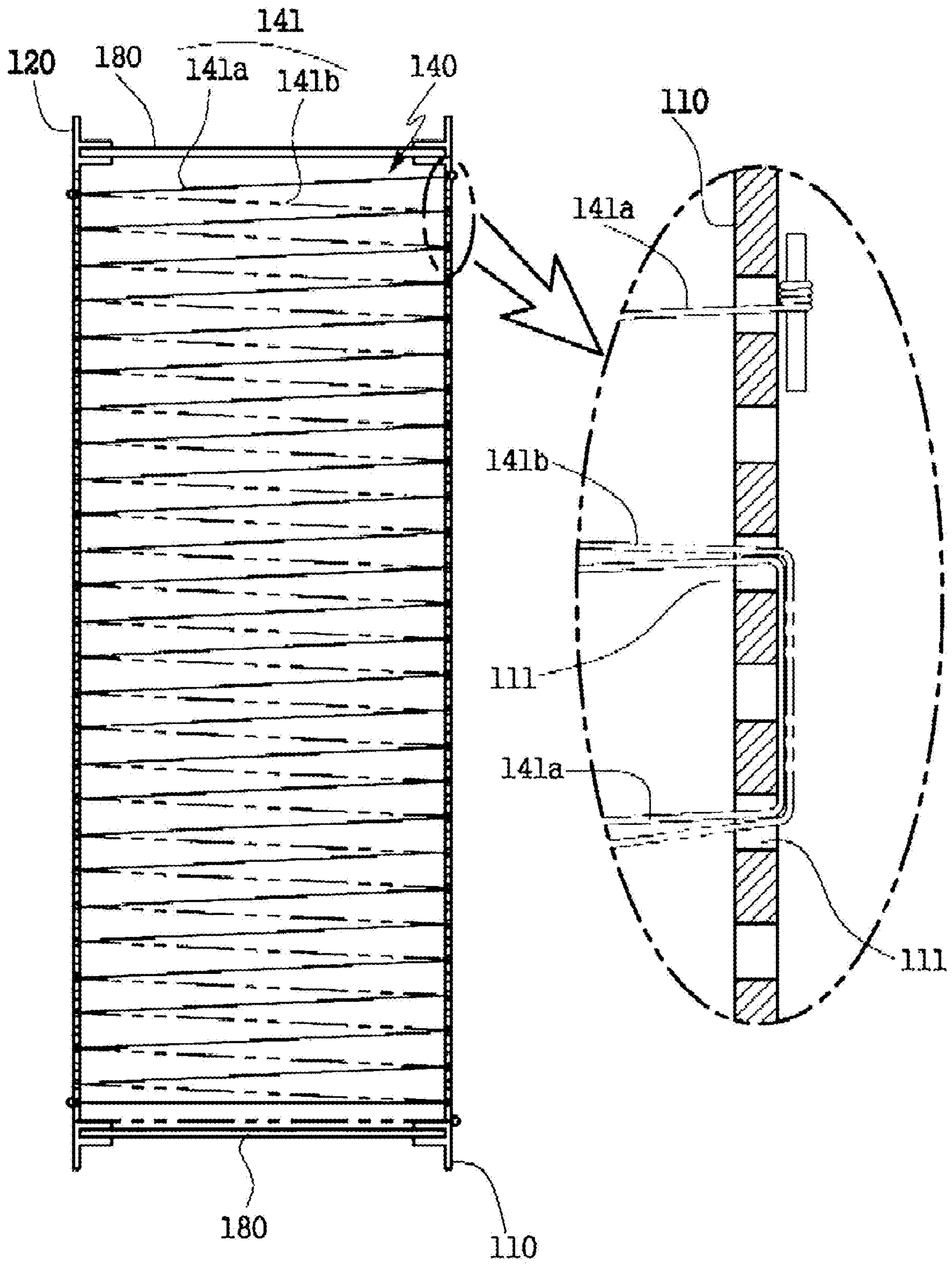
FIG. 5 is a plan view illustrating the curved base meshed in a triangular shape in FIG. 4.
Figure 6:
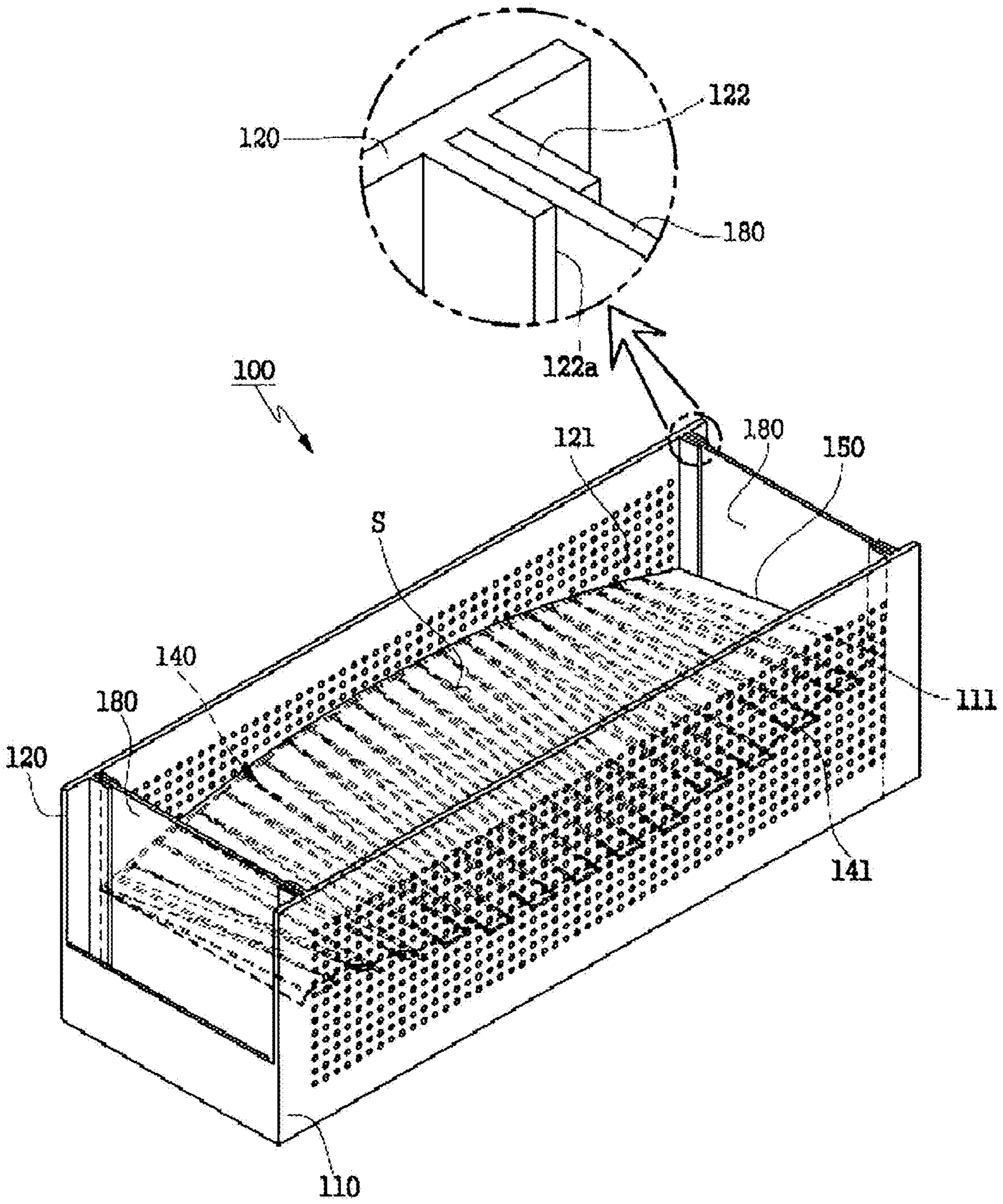
FIG. 6 is a schematic view illustrating a state in which a sheet member is placed on the curved base of FIG. 4.
Figure 7:
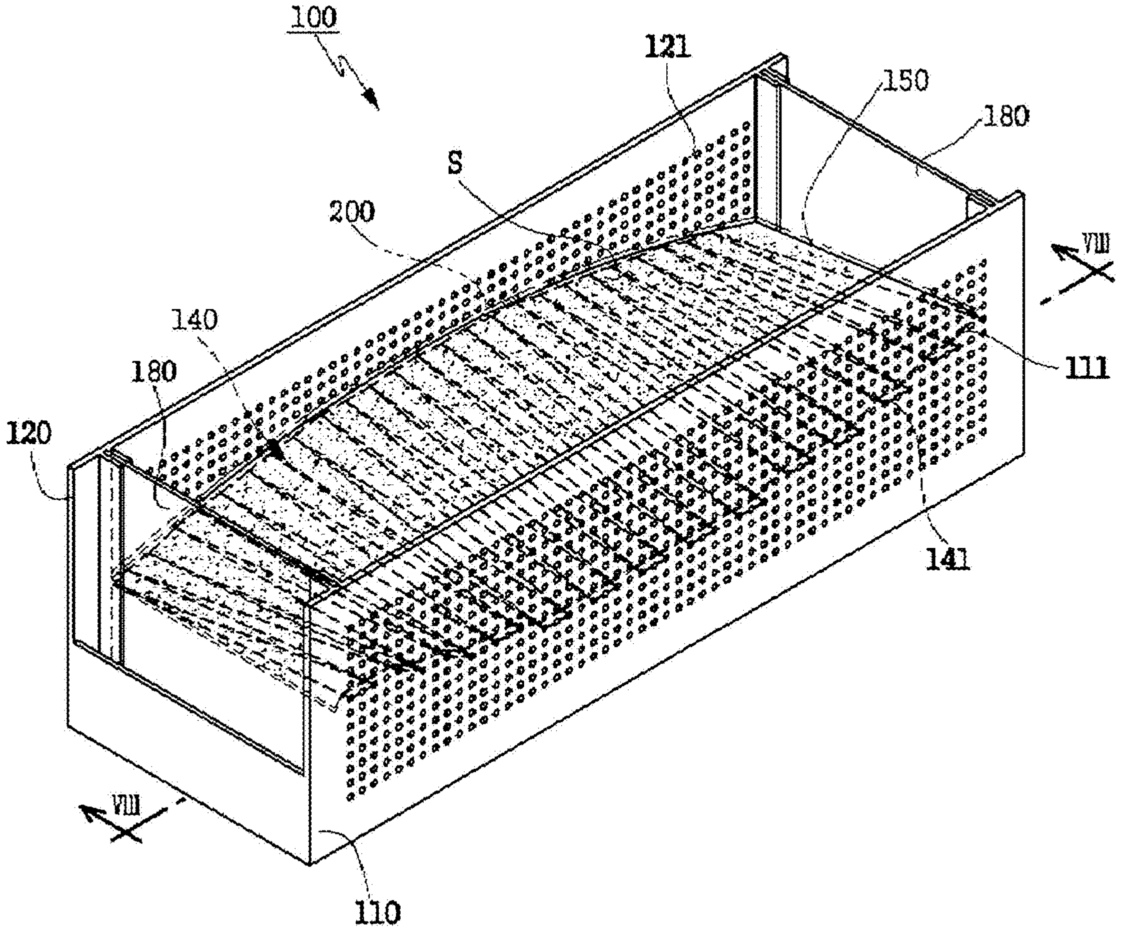
FIG. 7 is a schematic view illustrating a state in which construction panel material is applied to the sheet member of FIG. 6.
Figure 8:
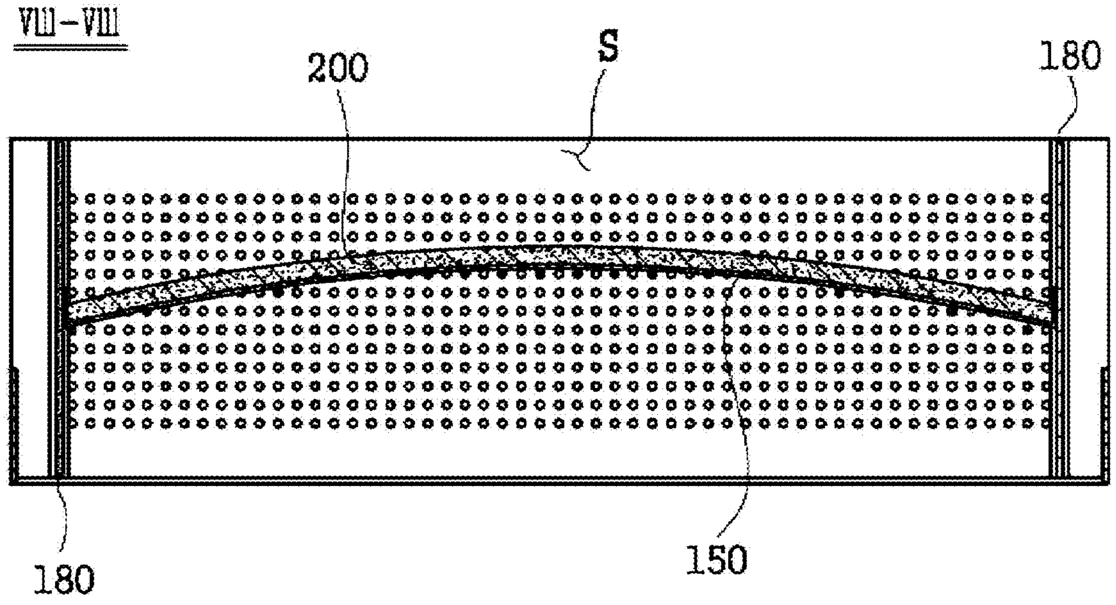
FIG. 8 is a sectional view taken along line VIII-VIII in FIG. 7.

FIG. 1 is a schematic view illustrating a mold according to an embodiment of the present inventive concept, FIG. 2 is an exploded view of FIG. 1, FIG. 3 is an enlarged view of a portion of a first side panel in FIG. 2, FIG. 4 is a schematic view illustrating a state in which a curved base is meshed and woven to first and second side panels of FIG. 2 in a triangular shape, FIG. 5 is a plan view illustrating the curved base meshed in a triangular shape in FIG. 4, FIG. 6 is a schematic view illustrating a state in which a sheet member is placed on the curved base of FIG. 4, FIG. 7 is a schematic view illustrating a state in which construction panel material is applied to the sheet member of FIG. 6, and FIG. 8 is a sectional view taken along line VIII-VIII in FIG. 7.

Referring to FIGS. 1 through 8, a mold 100 according to an embodiment of the present inventive concept is designed to manufacture construction panels with curved surfaces, where the surface on which the construction panel material is applied is formed into a curve by the continuous connection of a rope.

The mold 100 includes a first side panel 110, a second side panel 120, a curved base 140, and a sheet member 150, so a curved surface of a construction panel manufactured therethrough can be formed freely. The mold 100 may also include a spacer 130 and a barrier plate 180.

The first side panel 110 and the second side panel 120 face each other and have a predetermined width. Lower portions of both ends of the first side panel 110 and the second side panel 120 in the length direction are connected by spacers 130. The vertical dimensions of the spacers 130 are smaller than the vertical dimensions of the first side panel 110 and the second side panel 120. The spacers 130 maintain the distance between the first side panel 110 and the second side panel 120. The width of the first side panel 110 and the second side panel 120 and the length of the spacers 130 can vary depending on the specifications of the construction panel to be manufactured.

Moreover, barrier plates 180 are respectively placed at the ends of the first side panel 110 and the second side panel 120 in the length direction. The barrier plates 180 are inserted into coupling grooves 112*a* and 122*a* formed in the first side panel 110 and the second side panel 120. The coupling grooves 112*a* and 122*a* are formed in brackets 112 and 122 positioned on the inner surfaces of the first side panel 110 and the second side panel 120 in the vertical length direction. However, the coupling grooves 112*a* and 122*a* can be directly formed on the inner surfaces of the first side panel 110 and the second side panel 120.

The first side panel 110, the second side panel 120, and the barrier plates 180 form a molding space S inside the mold 100 for molding a construction panel. A construction panel with a curved surface can be manufactured in the molding space S.

The first side panel 110 and the second side panel 120 each have a plurality of holes 111 and 121 that penetrate through in a width direction Y. The plurality of holes 111 and 121 are arranged in the Z-axis and X-axis directions from predetermined positions on the first side panel 110 and the second side panel 120. A distance L between the centers of the adjacent holes may be from 5 mm to 10 mm. If the distance L is formed less than 5 mm, the holes 111 and 121 may be densely formed, it may weaken the strength of the first side panel 110 and the second side panel 120. If the distance L exceeds 10 mm, the interval of the holes 111 and 121 becomes wide, and the interval between ropes located in the molding space S to form a curved surface becomes wider, so the precision of the curved surface of the construction panel being manufactured may be reduced. The distance L between the centers of adjacent holes is not limited to 5 mm to 10 mm. The distance L between the centers of adjacent holes can vary widely depending on the design of the mold 100.

Meanwhile, scales 170 may be marked along the X-axis and Z-axis at the lower end and one end of the outer surfaces of the first side panel 110 and the second side panel 120. The scales 170 indicate the positions of the holes 111 and 121. To make it easier to find the positions of the selected scales 170, numbers may be marked on the scales 170 of the X-axis, and alphabet letters may be marked on the scales 170 of the Z-axis. Numbers may also be marked on the scales 170 of both the X-axis and Z-axis.

The first side panel 110 and the second side panel 120 can be made of metal, wood, plastic, or similar materials. Additionally, the first side panel 110 and the second side panel 120 may be detachable from the mold 100 and can be replaced with another side panel.

In the description and drawings above, it has been described that the holes 111 and 121 respectively penetrate through the first side panel 110 and the second side panel 120. However, the first side panel 110 and the second side panel 120 can be formed in a mesh form where horizontal and vertical bars are cross-linked at intervals from each other. Holes are formed between the cross-linked horizontal and vertical bars.

Furthermore, sheets (not illustrated) may be placed on the inner surfaces of the first side panel 110 and the second side panel 120 to block the holes 111 and 121. The sheets can prevent the construction panel material applied for manufacturing a construction panel from leaking through the holes 111 and 121 to the exterior of the first side panel 110 and the second side panel 120. The sheets may tear when the curved base 140 is coupled. The sheets can be made of materials such as vinyl.

The curved base 140 is formed by the rope 141. The rope 141 can be made of freely bendable and expandable fibers or resin fibers, such as nylon, carbon fibers, or Kevlar. For example, the rope 141 may be a fishing line. The rope 141 can be formed in a monofilament or braiding form. However, the rope 141 can also be made of metal. The diameter of the rope 141 is smaller than the diameter of the holes 111 and 121 formed in the first side panel 110 and the second side panel 120. So, the rope 141 can pass through the holes.

The curved base 140 formed by the rope 141 is located in the molding space S and is woven to the holes 111 and 121 of the first side panel 110 and the second side panel 120 to form a predetermined curved surface within the molding space S. The shape of the curved surface can vary depending on the positions of the holes 111 and 121 through which the rope 141 passes. For instance, the rope 141 enters the molding space S through the hole 111 determined outside the first side panel 110, then passes through the hole 121 determined inside the second side panel 120, and is located on the exterior of the second side panel 120. Thereafter, the rope 141 re-enters the molding space S through another determined neighboring hole outside the second side panel 120, and then passes through another determined neighboring hole outside the first side panel 110. In this manner, the rope 141 is continuously connected from one end to the other end of the first side panel 110 and the second side panel 120 to form a predetermined curved surface in the molding space S.

Furthermore, the curved base 140 formed by the rope 141 woven to the first side panel 110 and the second side panel 120 in the molding space S forms a mesh structure, and when viewed from above, forms a pattern of triangles repetitively connected. So, the installation stability of the curved base 140 can be enhanced.

However, depending on the structure that the rope 141 is woven to the first side panel 110 and the second side panel 120, the shape of the curved base 140 viewed from above can vary significantly.

Meanwhile, the rope 141 can be a single component continuously connected to form triangles. For example, one rope 141 passes through the determined hole 111 of the first side panel 110 and advances toward the next predetermined hole 121 of the second side panel 120. The above process is repeated to the final hole of the first, continues through the next until reaching the last hole of the first side panel 110 or the second side panel 120. The rope 141 can then be directed in the opposite direction from the last hole of the first side panel 110 or the second side panel 120 to complete the mesh structure of the curved base 140.

Additionally, the rope 141 includes a first member 141*a* and a second member 141*b*. The first member 141*a* weaves from the first side panel 110 to the second side panel 120, and the second member 141*b* weaves from the second side panel 120 to the first side panel 110 to form triangles.

The sheet member 150 can be located in the molding space S and placed on the curved base 140. The sheet member 150 is arranged along the curved surface formed by the curved base 140. Both sides of the sheet member 150 of the sheet member 150 in the width direction are in contact with the inner surfaces of the first side panel 110 and the second side panel 120, and both ends in the length direction are in contact with the barrier plates 18 to decide the limit. So, the sheet member does not get out of the molding space S. The outer boundary of the sheet member 150 is arranged by the periphery of the molding space S.

The sheet member 150 may be made of latex or silicone. However, the sheet member 150 can be made from non-woven fabrics, textiles, geotextile fabrics, spandex, etc. The sheet member 150 can be made of various materials and may vary in various ways according to the design of the mold 100. To adjust the strength of the sheet member 150, two or more different types of sheet members may be layered. A coating layer (not illustrated) may be formed on the sheet member 150.

The thickness of the sheet member 150 may be less than 2.5 mm. Preferably, the thickness of the sheet member 150 may range from 0.1 mm to 2.5 mm. If the thickness of the sheet member 150 is less than 0.1 mm, the sheet member 150 may get torn when the construction panel material is applied. When the thickness of the sheet member 150 exceeds 2.5 mm, the precision of the curved base 140 may be deteriorated due to insufficient flexibility of fabric.

The thickness of the sheet member 150 may vary depending on the application thickness of the construction panel material. The thickness of the sheet member 150 is proportional to the application thickness of the construction panel material. The thickness of the sheet member 150 can be set by stacking in multiple layers.

A construction panel material 200 can be applied to the surface of the sheet member 150. In this instance, the outer boundary of the construction panel formed by plastic-forming of the construction panel material 200 can be neatly arranged by the sheet member 150, of which the outer boundary is arranged by the first side panel 110, the second side panel 120, and the barrier plates 180.

When the sheet member 150 is pressed by the construction panel material applied on the sheet member 150, the triangular shape can be formed on the surface of the construction panel dried after being applied. Accordingly, the aesthetic expression of the manufactured construction panel can be enhanced. However, if the thickness of the sheet member 150 exceeds 2.5 mm, the pressing of the sheet member 150 may be insufficient, resulting in the triangular shape not being formed on the surface of the manufactured construction panel.

Figure 9:
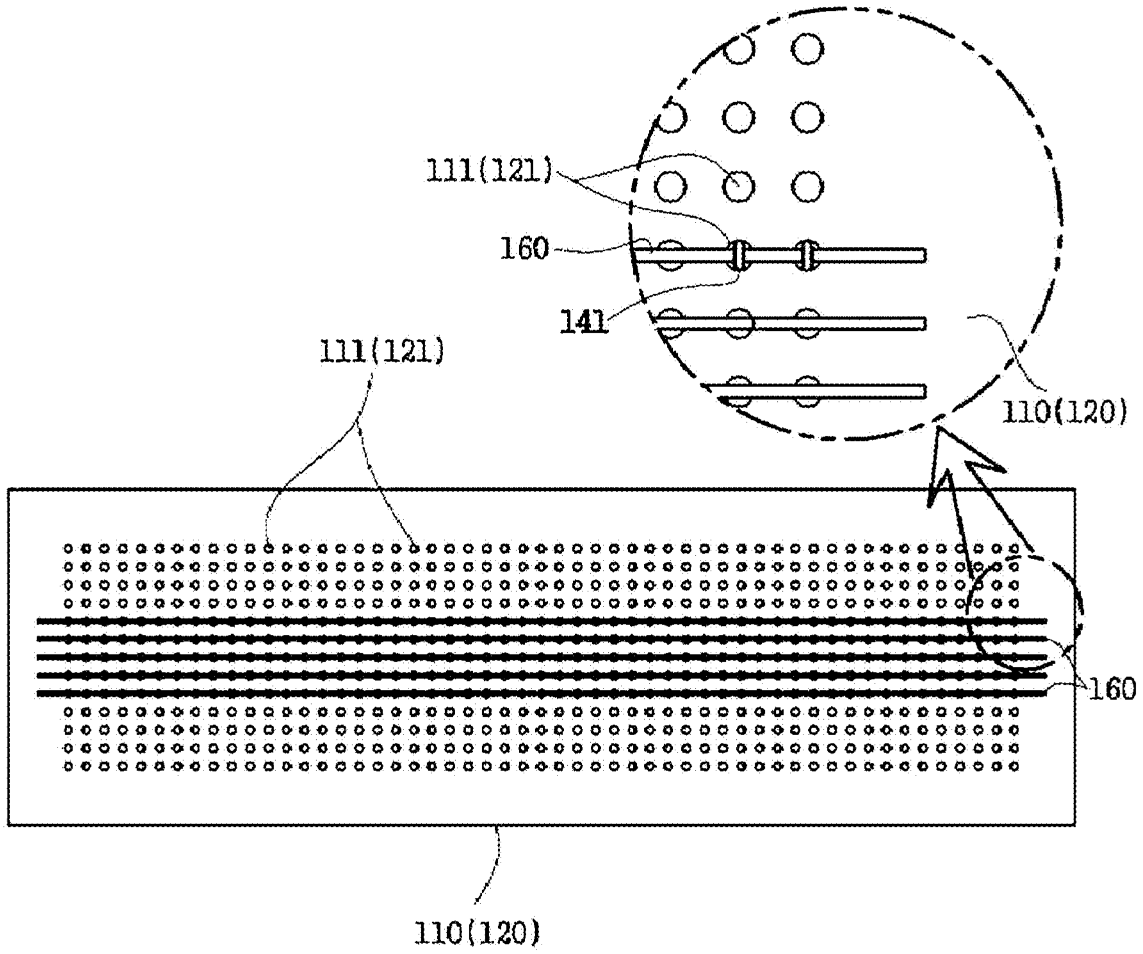
FIG. 9 is a schematic view illustrating another embodiment where a rope of the curved base is combined with a side panel.

Referring to FIGS. 1 to 8, another embodiment of the present inventive concept includes most of the components of the embodiment described above. However, as illustrated in FIG. 9, another embodiment of the present inventive concept may further include a bar-shaped fixing members 160 formed on the first side panel 110 and the second side panel. The fixing members 160 are vertically arranged in the length direction of the first side panel 110 and the second side panel of the fixing member 160, and are positioned in the vertical direction. The number of the arranged fixing members 160 can vary depending on the shape of the curved surface of the construction panel to be manufactured.

Other components may be applied as in embodiments of FIGS. 1 to 8 as they are.

Next, a construction panel manufacturing method according to an embodiment of the present inventive concept will be described with reference to FIG. 10.

Figure 10:
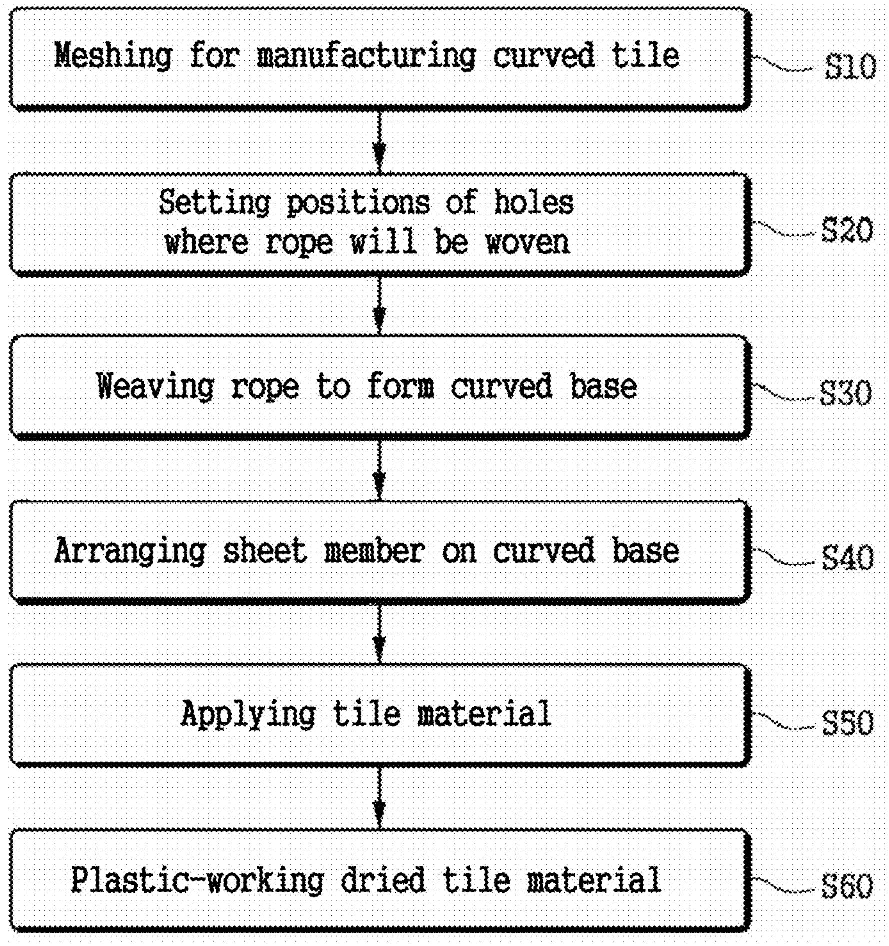
FIG. 10 is a block diagram illustrating a construction panel manufacturing method according to an embodiment of the present inventive concept.

FIG. 10 is a block diagram illustrating a construction panel manufacturing method according to an embodiment of the present inventive concept.

Referring to FIGS. 1 through 9 and FIG. 10, the construction panel manufacturing method according to an embodiment of the present inventive concept includes: a step (S10) of meshing; a step (S20) of setting the position of holes for weaving a rope; a step (S30) of weaving the rope to form a curved base; a step (S40) of arranging a sheet member on the curved base; a step (S50) of applying construction panel material; and a step (S60) of plastic-working the dried construction panel material, thereby ensuring that construction panels have the same curved surfaces when manufactured repeatedly.

The step (S10) of meshing is the step of forming a drawing for manufacturing construction panels with curved surfaces. To manufacture construction panels requested by a customer, a drawing is formed through digital work using a 3D modeling program such as parametric design tools like AutoCAD, Solidworks, or Rhino, and a program like the parametric design tool such as Grasshopper. The curved surface of the construction panel to be manufactured can be meshed through the drawing. That is, the curved surface of the construction panel to be manufactured is meshed by drawing work (digital work).

The step (S20) of setting positions involves setting the positions on the side panels where a rope will be woven to create the mesh. To form the meshed state in the mold 100, the positions where the rope 141 will be woven on the first side panel 110 and the second side panel 120 are set. That is, positions of holes 111 and 121 to weave the rope 141 on the first side panel 110 and the second side panel 120 respectively are set based on the drawing. In this instance, the markings of scales, numbers, and alphabets on outer surfaces of the first side panel 110 and the second side panel 120 facilitate easy identification of the positions of the holes 111 and 121.

The step of forming the curved base (S30) involves weaving the rope on the side panels to form the curved base which forms the curved surface of the construction panel to be manufactured. The rope 141 is woven on the holes 111 and 121 set in the first side panel 110 and the second side panel 120. The ropes 141 enters the molding space S through the first hole 111 set outside the first side panel 110, passes through the set first hole 121 of the second side panel 120, and then, is exposed to the outside. As described above, the rope 141 passes through the set holes 111 and 121, and is woven on the holes 111 and 121 to be fixed to the first side panel 110 and the second side panel 120. The rope 141 forms the curved base 140 having the curved surface in the molding space S.

Meanwhile, when a sheet is attached to the inner surfaces of the first side panel 110 and the second side panel 120, the rope 141 passes through the sheet of the set holes.

The step of arranging the sheet member on the curved base (S40) involves arranging the sheet member on the meshed curved base to apply the construction panel material. A sheet member 150 made of latex or silicone, with a thickness ranging from 0.1 mm to 2.5 mm, can be placed on the curved base 140. The sheet member 150 is arranged in a curved shape in the molding space S along the curved base 140.

The outer boundary of the sheet member 150 is supported by being in contact with the inner surfaces of the first side panel 110, the second side panel 120, and the barrier plates 180 that form the periphery of the molding space S. Particularly, the barrier plates 180 set limits to prevent the sheet member 150 from overflowing, and support and brace the sheet member 150 at the corners thereof. Additionally, the barrier plates 180 neatly arrange the edges of the sheet member 150.

The step (S50) of applying the construction panel material involves applying concrete, which is the construction panel material 200. The construction panel material 200 is applied onto the sheet member 150 to a predetermined thickness. In this instance, the concrete applied to the sheet attached to the inner surfaces of the first side panel 110 and the second side panel 120 does not leak to the exterior of the first and second side panels through the holes 111 and 121.

In addition, the first side panel 110, the second side panel 120, and the barrier plate 180 support the periphery of the sheet member 150, so that the periphery of the construction panel is formed to be flat.

The construction panel material is not limited to concrete, and the application thickness can vary depending on the installation site of the curved construction panel, customer requirements, etc. A portion of the sheet member 150 which is not supported by the curved base 140 may sag toward the bottom of the molding space S due to the weight of the construction panel material. In this instance, when the construction panel material is dried, the triangular shape of the curved base 140 may be formed on a portion of the dried construction panel being in contact with the sheet member 150. Drying of the construction panel material can be achieved in the natural state. To enhance the drying efficiency of the construction panel material, hot air may be supplied to the molding space S.

Additionally, the step (S50) of applying the construction panel material, at least two screws can be positioned to protrude above the surface of the construction panel material. The plurality of screws can be made of metal. The plurality of screws can be fixed at regular intervals before the construction panel material is hardened. Here, since it is difficult to keep the screws fixed until the construction panel material is hardened, a plate can be connected to the upper portion of the plurality of screws, and the plurality of screws can be fixed by the upper plate until the construction panel material is hardened. Consequently, the plurality of screws can be inserted or joined when the construction panel is attached to the exterior or interior walls of a building after completion of the construction panel.

Moreover, to enhance the strength of the construction panel, instead of using concrete alone as the construction panel material, glass fiber reinforced concrete (GFRC) or ultra-high performance concrete (UHPC) that contains glass fiber may be used.

The step (S60) of plastic-working is to increase the strength of the dried construction panel material. The dried construction panel material is separated from the sheet member 150. Through the plastic-working, the construction panel material is to manufacture a construction panel with strength.

Accordingly, by continuing to use the first and second side panels, construction panels with various curved forms can be manufactured by varying the weaving of the rope according to the curved surface of the construction panel to be manufactured, thereby enhancing the manufacturing efficiency of construction panels with curved surfaces.

While the preferred embodiments of the present inventive concept have been described in detail, the scope of the inventive concept is not limited thereto, and various modifications and improvements made by those skilled in the art utilizing the fundamental concepts of the present inventive concept as defined in the following claims also fall within the scope of the inventive concept.

The invention claimed is:

1. A mold, comprising:

a first side panel and a second side panel spaced apart from each other and positionally fixed relative to one another, wherein each of the first side panel and the second side panel has an array of holes extending therethrough;

a continuous rope threaded through only some holes in the array of holes in each of the first side panel and the second side panel forming a meshed curved base between the first side panel and the second side panel; and a sheet member arranged on the meshed curved base for forming a curved surface on which a material for manufacturing a construction panel can be applied.

2. The mold according to claim 1, wherein, within each of the first and second side panels, holes in the array of holes are spaced apart from each other along different directions such that a distance between centers of adjacent holes in the array ranges from 5 mm to 10 mm.

3. The mold according to claim 2, wherein the rope is continuously woven and connected from one end of the first and second side panels to another end of the first and second side panels.

4. The mold according to claim 3, wherein the rope is made of fiber yarn or resin yarn.

5. The mold according to claim 1, wherein the sheet member is made of latex or silicone with a thickness of 2.5 mm or less.

6. The mold according to claim 1, further comprising:

a fixing member which is placed outside the first and second side panels and to which the rope passing through the first and second side panels is woven.

7. A construction panel manufacturing method comprising:

providing a first side panel and a second side panel spaced apart from each other and positionally fixed relative to one another, wherein each of the first side panel and the second side panel has an array of holes extending therethrough;

threading a rope through only some holes in the array of holes in each of the first side panel and the second side panel to form a meshed curved base between the first and second side panels;

arranging a sheet member on the meshed curved base;

applying construction panel material on the sheet member; and drying the applied construction panel material and separating the dried construction panel material from the sheet member to perform plastic-working.

8. The construction panel manufacturing method according to claim 7, wherein the rope is continuously connected from one end of the first and second side panels to another end of the first and second side panels.

9. The construction panel manufacturing method according to claim 7, wherein, in forming the meshed curved base, a shape of the curved base positioned between the first and second side panels when viewed from above forms a shape that triangles are continuously connected through the continuous connection of the rope.

* * * * *